United States Patent
Dahlgren

(10) Patent No.: US 6,684,271 B1
(45) Date of Patent: Jan. 27, 2004

(54) METHOD AND APPARATUS FOR CHANGING CONTEXT IN LINK CHANNELIZATION

(75) Inventor: Kent Blair Dahlgren, Petaluma, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 10/273,970

(22) Filed: Oct. 18, 2002

(51) Int. Cl.$^7$ .............................. G06F 3/00; G06F 5/00
(52) U.S. Cl. ..................... 710/38; 709/253; 370/463
(58) Field of Search ............... 710/36, 38; 709/253; 370/463, 465

(56) References Cited

U.S. PATENT DOCUMENTS 4,958,342 A * 9/1990 Williams et al. ............. 370/465
5,991,817 A * 11/1999 Rowett et al. ............... 709/250
6,101,255 A * 8/2000 Harrison et al. ............. 380/52

* cited by examiner

*Primary Examiner*—Matthew Kim
*Assistant Examiner*—Pierre M. Vital
(74) *Attorney, Agent, or Firm*—H. C. Chan

(57) ABSTRACT

The present invention allows preloading of channel context in advance of actual channel change in a digital communication system. The system uses a channel identification signal to identify the present channel number of data on a data bus. Before the actual change in channel, a future channel number is inserted into the channel identification signal. Another signal is used to indicate the location of the future channel number in the channel identification signal. As a result, the system is able to know in advance the new channel number. The corresponding context can be loaded before the arrival of the new channel data.

11 Claims, 2 Drawing Sheets

METHOD AND APPARATUS FOR CHANGING CONTEXT IN LINK CHANNELIZATION

FIELD OF THE INVENTION

This invention relates generally to digital communication, and more particularly to method and apparatus for rapidly switching of channel context.

BACKGROUND OF THE INVENTION

As the processing power of processing elements increases, there is a need for the processing elements to communicate with each other using high performance digital communication connections. One method to increase the performance is to use the same bus to handle the communication of multiple channels (channelization). Each channel is generally with its processing state. The processing state is typically encoded as static variables or arrays that allow a communication controller to correctly interpret the data in each channel. The encoded parameters are called "channel context".

Implementing channelization means that the processing elements must be able to change their processing state as the channel changes. For simple processing functions and a small numbers of channels, the processing element will be able to store this state within the core and change state quickly. More complex processing function that must retain a large amount of state information for each channel context may have to store these contexts in external memory and there may be a significant latency associated with context changes.

SUMMARY OF THE INVENTION

The invention provides a method and system for loading channel context in advance of the actual channel change. The system uses a channel identification signal to identify the present channel number of data on a data bus. Before the actual change in channel, a future channel number is inserted into the channel identification signal. Another signal is used to indicate the location of the future channel number in the channel identification signal. As a result, the system is able to know in advance the new channel number. The corresponding context can be loaded before the arrival of the new channel data. Consequently, there is no or little latency associated with the context change.

The above summary of the present invention is not intended to describe each disclosed embodiment of the present invention. The figures and detailed description that follow provide additional example embodiments and aspects of the present invention.

DETAILED DESCRIPTION OF THE DRAWINGS

The present invention relates to a new digital communication mechanism. In the following description, numerous specific details are set forth in order to provide a more thorough understanding of the present invention. However, it will be apparent to one skilled in the art that the present invention may be practiced without these specific details. In other instances, well-known features have not been described in detail in order to avoid obscuring the present invention.

Figure 1:
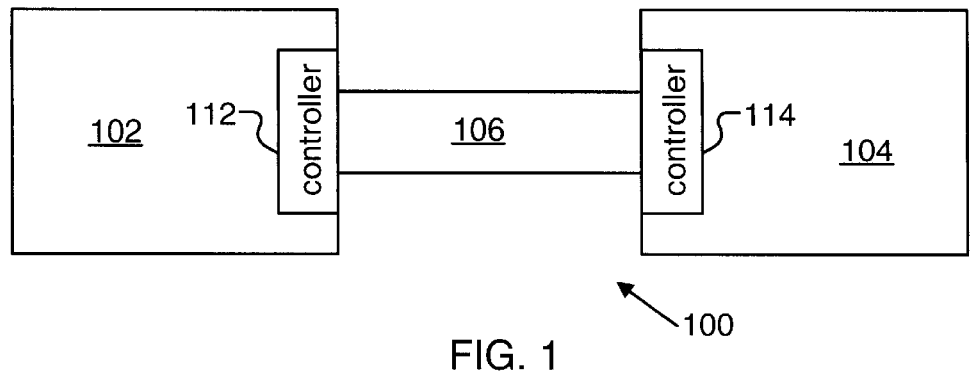
FIG. 1 is a block diagram of a system that can use the digital communication of the invention.

FIG. 1 is a drawing showing a system 100 of the present invention. It contains two processing elements 102 and 104 separated by a plurality of buses and signal lines (shown collectively as numeral reference 106). Each processing element contains a controller (such as controllers 112 and 114) that receives signals from and drives signals to buses/lines 106.

It should be noted that the present invention is application to a system that has many processing elements that are connected to each other in various ways.

Figure 2:
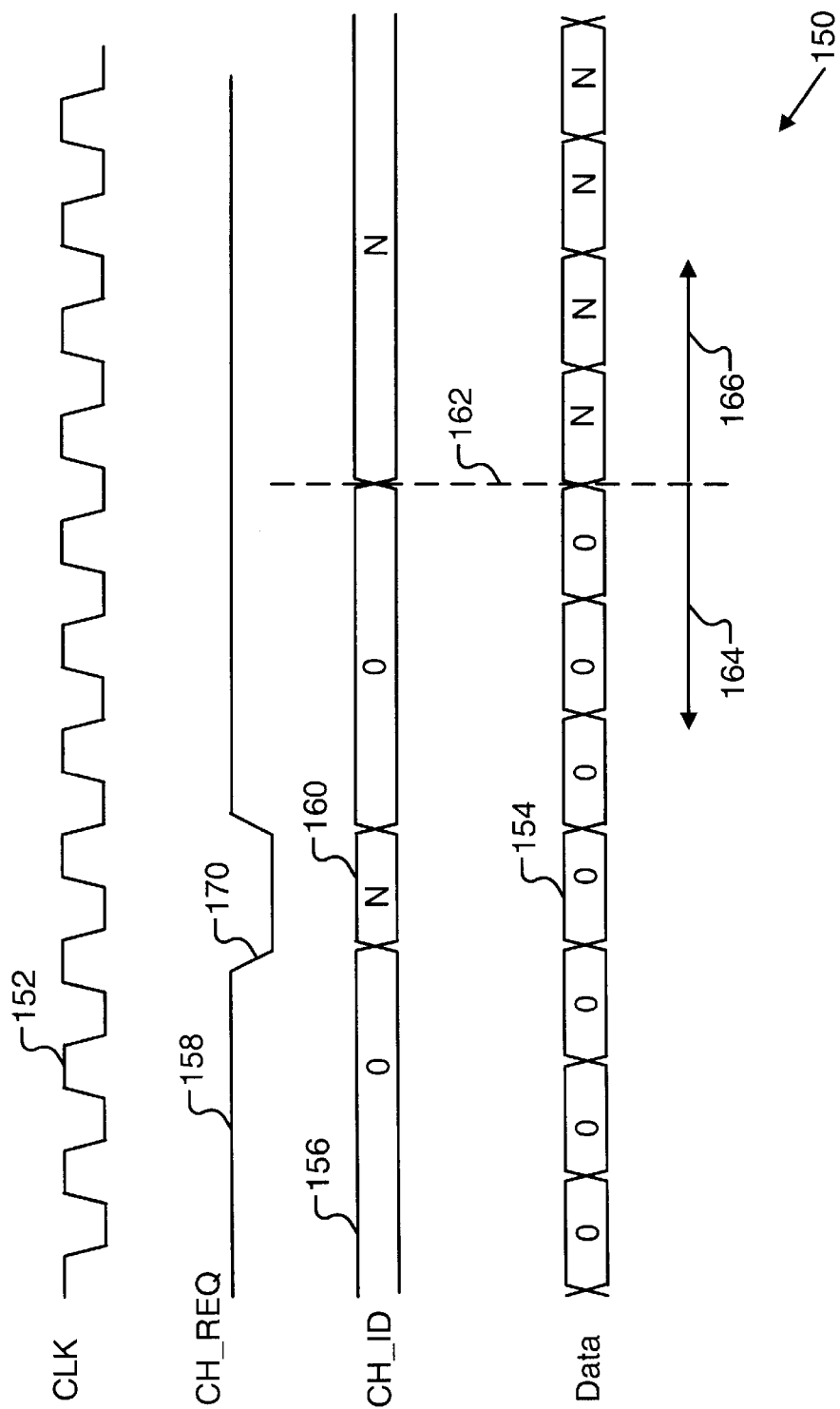
FIG. 2 shows various signals used in the present invention.

Signals and busses that are relevant to the present invention are shown in signal graphs 150 of FIG. 2. Graphs 150 show a clock signal 152 that is used to synchronize the operation of the system. A data bus 154 is used to deliver data from a source processing element to a destination processing element. A channel identification (ID) bus 156 is used to identify the channel number of the data currently in data bus 154. At times indicated by a channel request signal 158, channel ID bus 156 generates a number (future channel number) indicating that data bus 154 will be used to deliver data for the channel having this number. The controller can use the information to access the corresponding channel context in advance of the arrival of the data for the channel. As a result, the performance of system 100 of FIG. 1 can be improved.

In order to provide more details of the operation of the present invention, a time line 162 is used to separate the data in data bus 152. In the direction indicated by a line 164, data of a first channel (e.g., channel "0") is delivered by data bus 154. In the direction indicated by a line 166, data of a second channel (e.g., channel "N") is delivered by data bus 154. At a time prior to time line 162, channel request signal 158 changes state for a short time interval (e.g., from high to low, as shown in reference numeral 170). During this time interval, the value in channel ID bus 156 changes from a value of "0" to a value of "N" (shown as reference numeral 160), which is the value for the second channel. After time interval 170, the value in channel ID bus 156 returns to "0". As a result, the controller can correctly interpret the information delivered by these signals. Channel context can be retrieved after time interval 170 and before time line 162.

Figure 3:
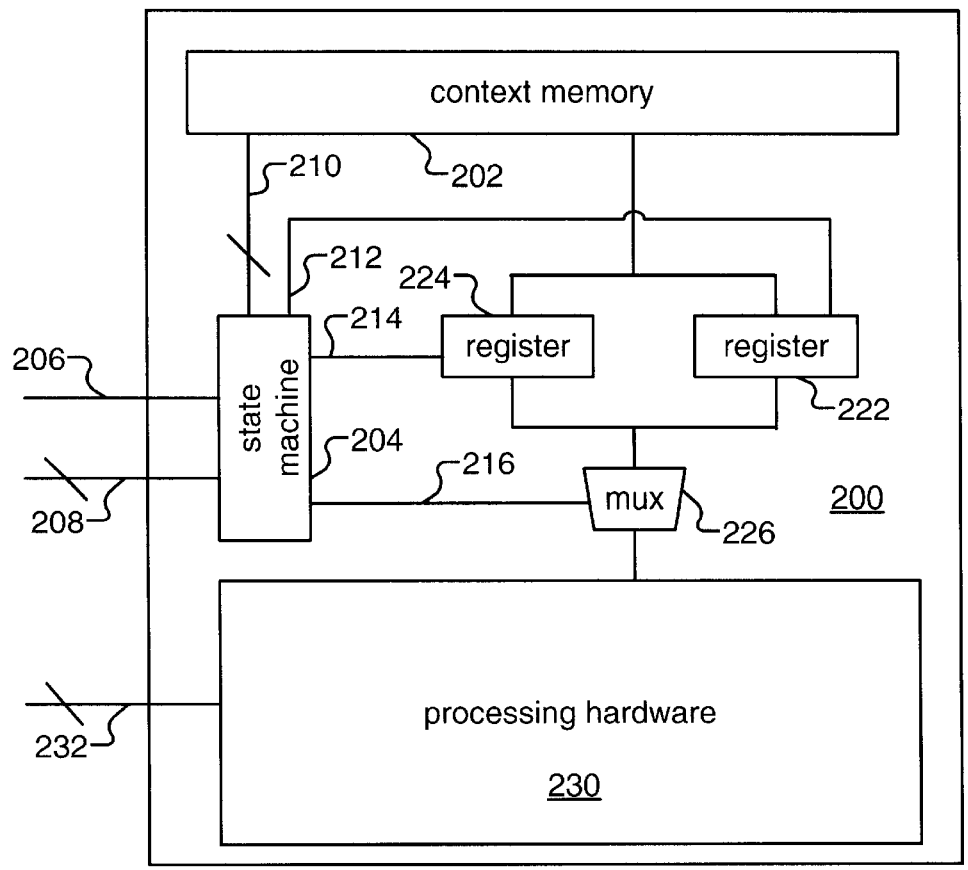
FIG. 3 is a block diagram of a processing element of the present invention.

An exemplary processing element 200 that can handle the signals of the present invention is shown in FIG. 3. Element 200 contains context memory 202 that stores channel context information of all the channels. Element 200 also contains a state machine 204 that accepts a channel request signal on a line 206 and channel ID on a bus 208. State machine 204 generates addresses on an address bus 210 so that contexts stored in context memory 202 can be retrieved. It also generates enable signals 212, 214 and select signal 216 to control the operations of two registers 222, 224 and a multiplexor 226, respectively.

In operation, state machine 204 receives the channel ID and channel request through bus 208 and line 206. Upon knowing that a new channel will be delivered, it generates a corresponding address on address bus 210 to retrieve the new channel context from context memory 202. State machine 204 also enables one of the registers 222 and 224 (e.g., register 222) to receive the channel context. When data of the new channel is delivered, state machine 204 causes multiplexor 226 to connect register 222 to a processing hardware 230. As a result, processing hardware 230 can use the new channel context to process data arriving from data bus 232.

When the channel request signal indicates that another new channel is scheduled to arrive, state machine 204 generates the corresponding address. It then enables the other register (i.e., register 224) to receive from context memory 202 the channel context for the next new channel. At appropriate time, state machine 204 causes multiplexor 226 to connect register 224 to processing hardware 300 to process data of the new channel.

It can be seen from above that a high performance digital communication system has been described. Additionally, the description above is intended by way of example only and is not intended to limit the present invention in any way, except as set forth in the following claims.

What is claimed is:

1. A method for providing channel context to a system that transmits data of a plurality of channels on a data bus and uses a channel identification signal to indicate channel numbers of the data on the data bus, the method comprising:

sending data on a channel of the plurality of channels;

providing the channel identification signal with a current channel number for the channel of the plurality of channels; and inserting a future channel number into the channel identification signal for another channel of the plurality of channels while the data is sent for the channel, the future channel number inserted in advance of the data for the other channel.

2. A method for providing channel context to a system that transmits data of a plurality of channels on a data bus and uses a channel identification signal to indicate channel numbers of the data on the data bus, the method comprising:

receiving a channel request signal;

receiving the channel identification signal, the channel identification signal containing a current channel number and a future channel number, the channel identification signal;

changing from the current channel number to the future channel number in response to the channel request signal while receiving data for the current channel, the future channel number asserted in advance of the data for a future channel associated with the future channel number.

3. The method of claim 2 further comprising retrieving corresponding channel context from memory after receiving the future channel number.

4. The method of claim 3 further comprising generating an address for the memory that is associated with the future channel number.

5. The method of claim 2 further comprising providing two registers for alternatively receiving the channel context from memory.

6. The method, according to claim 2, wherein the receiving of the channel identification signal further comprises changing from the future channel number back to the current channel number in response to the channel request signal while receiving data for the current channel.

7. A system for providing channel context to a device that can process data of a plurality of channels on a data bus, the channel context being stored in memory, the system comprising:

a first register; and a state machine for receiving a future channel number, generating a set of output signals in response to the future channel number to cause the first register to receive corresponding channel context from the memory, and generating another output signal in response to an input signal causing the corresponding channel context to be used by the device, the state machine configured to receive the future channel number while receiving the data for a current channel, the current channel associated with a current channel number which is not the future channel number, the future channel number provided to the state machine in advance of the data for the future channel number.

8. The system of claim 7 wherein the state machine is configured to provide a set of output signals including the address signal for the memory.

9. The system of claim 7 wherein the set of output signals comprises an enable signal for the first register.

10. The system of claim 7 further comprises a second register, wherein the set of output signals alternatively causing the first and the second registers to receive the channel context from the memory.

11. The system, according to claim 7, wherein the state machine is configured to switch back to receiving the current channel number after receiving the future channel number while receiving the data for the current channel.

* * * * *